(12) United States Patent
Reznik et al.

(10) Patent No.: US 7,757,947 B2
(45) Date of Patent: Jul. 20, 2010

(54) R.F.I.D. ENABLED STORAGE BIN AND METHOD FOR TRACKING INVENTORY

(75) Inventors: Dan Reznik, Plainsboro, NJ (US); Michael Faschinger, Graz (AT)

(73) Assignee: Siemens Aktiengesellschaft, Munich (DE)

( * ) Notice: Subject to any disclaimer, the term of this patent is extended or adjusted under 35 U.S.C. 154(b) by 410 days.

(21) Appl. No.: 11/686,375

(22) Filed: Mar. 15, 2007

(65) Prior Publication Data
US 2007/0215700 A1 Sep. 20, 2007

Related U.S. Application Data

(60) Provisional application No. 60/783,254, filed on Mar. 17, 2006.

(51) Int. Cl.
| | |
|---|---|
| *G07B 15/02* | (2006.01) |
| *G06F 19/00* | (2006.01) |
| *G06Q 30/00* | (2006.01) |
| *G06Q 90/00* | (2006.01) |
| *G08B 13/14* | (2006.01) |
| *B60R 25/00* | (2006.01) |
| *H04Q 5/22* | (2006.01) |

(52) U.S. Cl. .................. 235/384; 235/385; 235/487
(58) Field of Classification Search .............. 235/385, 235/487, 384; 340/572.1, 572.7, 572.8, 10.1, 340/5.73
See application file for complete search history.

(56) References Cited

U.S. PATENT DOCUMENTS

| | | | | |
|---|---|---|---|---|
| 6,392,544 B1 * | 5/2002 | Collins et al. | ............ | 340/572.7 |
| 6,829,520 B1 * | 12/2004 | Green | ......................... | 700/225 |
| 6,943,688 B2 * | 9/2005 | Chung et al. | ............ | 340/572.7 |
| 6,989,749 B2 * | 1/2006 | Mohr | ....................... | 340/572.1 |
| 7,042,358 B2 * | 5/2006 | Moore | ..................... | 340/572.1 |
| 7,053,775 B2 * | 5/2006 | Moore | ..................... | 340/572.1 |
| 7,310,070 B1 * | 12/2007 | Hardman et al. | ............ | 343/742 |
| 7,348,884 B2 * | 3/2008 | Higham | ................... | 340/572.1 |
| 7,511,601 B2 * | 3/2009 | Eisenberg et al. | .......... | 340/3.51 |
| 7,518,516 B2 * | 4/2009 | Azevedo et al. | .......... | 340/572.1 |
| 7,648,065 B2 * | 1/2010 | Marino | ....................... | 235/383 |
| 2002/0161652 A1 | 10/2002 | Paullin | | |
| 2002/0190845 A1 * | 12/2002 | Moore | ....................... | 340/10.3 |
| 2002/0196126 A1 * | 12/2002 | Eisenberg et al. | .......... | 340/10.2 |
| 2002/0196145 A1 * | 12/2002 | Moore | ....................... | 340/572.5 |
| 2003/0067381 A1 * | 4/2003 | Mitchell et al. | ............ | 340/5.92 |
| 2003/0071118 A1 * | 4/2003 | Gershman et al. | ............ | 235/385 |
| 2003/0141962 A1 * | 7/2003 | Barink | ..................... | 340/10.42 |
| 2003/0164754 A1 * | 9/2003 | Roseen | .................. | 340/309.16 |
| 2003/0179092 A1 * | 9/2003 | Loftus et al. | ............. | 340/572.7 |
| 2003/0209601 A1 * | 11/2003 | Chung | ......................... | 235/385 |
| 2004/0046020 A1 * | 3/2004 | Andreasson et al. | ......... | 235/385 |
| 2004/0144842 A1 * | 7/2004 | Brignone et al. | ............ | 235/385 |
| 2004/0212542 A1 * | 10/2004 | Rahim | .......................... | 343/742 |
| 2004/0224135 A1 * | 11/2004 | Krebs | ........................ | 428/195.1 |

(Continued)

FOREIGN PATENT DOCUMENTS

JP 2002 065418 A 3/2002

(Continued)

*Primary Examiner*—Daniel Walsh (57) ABSTRACT

A contents-aware storage bin includes a transportable bin unit adapted for placement within a storage bin rack. An RFID reader unit is in contact with the bin unit. An RFID antenna is connected to the RFID reader unit and is in contact with the bin unit.

16 Claims, 6 Drawing Sheets

U.S. PATENT DOCUMENTS

| | | | |
|---|---|---|---|
| 2005/0006569 A1* | 1/2005 | Yoshiyuki | 250/221 |
| 2005/0037190 A1* | 2/2005 | Browne | 428/304.4 |
| 2005/0040934 A1* | 2/2005 | Shanton | 340/5.92 |
| 2005/0046567 A1* | 3/2005 | Mortenson et al. | 340/539.13 |
| 2005/0156739 A1* | 7/2005 | Maloney | 340/572.1 |
| 2005/0171854 A1* | 8/2005 | Lyon | 705/24 |
| 2005/0275600 A1* | 12/2005 | Benton et al. | 343/873 |
| 2006/0022827 A1* | 2/2006 | Higham | 340/572.1 |
| 2006/0103532 A1* | 5/2006 | Van Fleet | 340/572.1 |
| 2006/0139172 A1* | 6/2006 | Waldner et al. | 340/572.7 |
| 2006/0280035 A1* | 12/2006 | Walker et al. | 368/10 |
| 2007/0001846 A1* | 1/2007 | August et al. | 340/571 |
| 2007/0040682 A1* | 2/2007 | Zhu et al. | 340/572.1 |
| 2007/0046464 A1* | 3/2007 | Onderko et al. | 340/572.1 |
| 2007/0046552 A1* | 3/2007 | Marino | 343/720 |
| 2007/0069895 A1* | 3/2007 | Koh | 340/572.1 |
| 2007/0075911 A1* | 4/2007 | Yaginuma et al. | 343/853 |
| 2007/0085681 A1* | 4/2007 | Sawyer | 340/572.1 |
| 2007/0103304 A1* | 5/2007 | Newton et al. | 340/572.1 |
| 2007/0119916 A1* | 5/2007 | Roewer | 235/376 |
| 2007/0215700 A1* | 9/2007 | Reznik et al. | 235/385 |
| 2007/0272746 A1* | 11/2007 | Ortiz et al. | 235/385 |
| 2007/0296595 A1* | 12/2007 | Moore | 340/572.7 |
| 2008/0042378 A1* | 2/2008 | Dick et al. | 280/29 |
| 2008/0046345 A1* | 2/2008 | Serre | 705/28 |
| 2008/0061979 A1* | 3/2008 | Hause et al. | 340/572.1 |
| 2008/0068173 A1* | 3/2008 | Alexis et al. | 340/572.7 |
| 2008/0094211 A1* | 4/2008 | Teller | 340/540 |
| 2008/0122615 A1* | 5/2008 | Shoenfeld | 340/540 |
| 2008/0173713 A1* | 7/2008 | Higham | 235/385 |
| 2008/0198015 A1* | 8/2008 | Lawrence et al. | 340/572.4 |
| 2008/0224826 A1* | 9/2008 | Kuwako et al. | 340/10.1 |
| 2008/0238682 A1* | 10/2008 | Kuwako et al. | 340/572.4 |
| 2008/0266092 A1* | 10/2008 | Campero et al. | 340/572.1 |
| 2008/0316045 A1* | 12/2008 | Sriharto et al. | 340/825.49 |
| 2009/0042654 A1* | 2/2009 | Barber | 463/42 |
| 2009/0058744 A1* | 3/2009 | Marino | 343/742 |
| 2009/0072949 A1* | 3/2009 | Fukuda et al. | 340/10.1 |
| 2009/0091453 A1* | 4/2009 | Ishida et al. | 340/572.1 |
| 2009/0251293 A1* | 10/2009 | Azevedo et al. | 340/10.1 |
| 2009/0299924 A1* | 12/2009 | Bauer et al. | 706/12 |
| 2009/0322486 A1* | 12/2009 | Gerstel | 340/10.1 |

FOREIGN PATENT DOCUMENTS

| | | |
|---|---|---|
| JP | 2005 119809 A | 5/2005 |
| WO | 2004/114241 A | 12/2004 |
| WO | 2005/116945 A | 12/2005 |
| WO | 2006/101651 A | 9/2006 |

* cited by examiner

R.F.I.D. ENABLED STORAGE BIN AND METHOD FOR TRACKING INVENTORY

CROSS-REFERENCE TO RELATED APPLICATION

The present application is based on provisional application Ser. No. 60/783,254, filed Mar. 17, 2006, the entire contents of which are herein incorporated by reference.

BACKGROUND OF THE INVENTION

1. Technical Field

The present disclosure relates to storage bins and, more specifically, to RFID enabled storage bins and methods for tracking inventory.

2. Discussion of the Related Art

Radio-frequency identification (RFID) is a method for automatic detection of objects. In RFID, miniature transponders called RFID tags are attached or otherwise incorporated into objects to be detected. An RFID reader capable of communicating with the RFID tag may be used to locate and authenticate the presence of the RFID tag.

RFID tags may be either active or passive. A passive RFID tag does not possess a power source and thus, its circuitry is designed to backscatter the signal sent by the RFID reader. The RFID tags backscatter signal is then interpreted by the RFID reader. In this way, the RFID tag is able to transmit an identification number, however, more sophisticated communication is also possible.

Because the passive RFID tag does not require a power source, it may be designed to have a very small size. The small size of the RFID tag allows for many practical applications. For example, small RFID tags can be attached to or integrated with such items as consumer products, industrial supplies or containers of pharmaceuticals.

Active RFID tags are equipped with their own power source and as such are able to provide an amplified outgoing signal that may be able to transmit for greater distances and through various obstacles.

Storage bins are containers of varying sizes and design. Storage bins often have an open top and a partially open front to allow for quick access to the contents stored therein. Storage bins are often constructed out of plastic so that they may be light-weight, durable and inexpensive.

Figure 1:
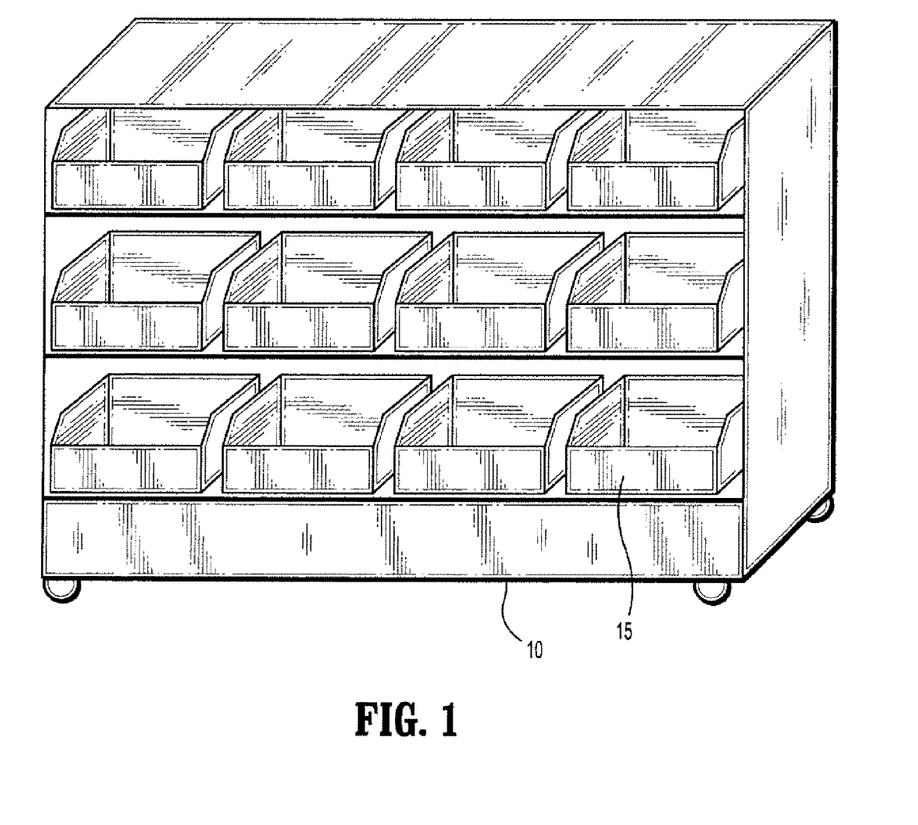
FIG. 1 is a schematic of a storage bin rack.

A storage bin rack is an apparatus for arranging and displaying multiple storage bins so that each storage bin is easily accessible. FIG. 1 illustrates an example of a storage bin rack. The storage bin rack 10 may be a shelf-like unit where multiple storage bins 15 may be placed. Storage bin racks may be either stationary or mobile and may often have attached wheels for convenient movement. Storage bins may either be loosely arranged within and upon the storage bin rack or the storage bin rack may be adapted to securely receive the storage bins. Many storage bin racks are equipped with closable doors so that the contents of the storage bins may be secured when not in use. The inner surface of the closable doors may also be used to hold storage bins.

Because of their high-degree of versatility and low cost, storage bins have a wide variety of industrial, commercial and home uses. In many such applications, people may be concerned with keeping track of the types and numbers of items stored in the bins. Accordingly, people may be tasked with counting and recounting the contents of each bin so that the bins may be kept fully stocked.

SUMMARY

A contents-aware storage bin includes a transportable bin unit adapted for placement within a storage bin rack. An RFID reader unit is in contact with the bin unit. An RFID antenna is connected to the RFID reader unit and is in contact with the bin unit.

A contents-aware storage bin includes a transportable bin unit adapted for placement within a storage bin rack. An RFID antenna is in contact with the bin unit. The RFID antenna connects to an RFID reader unit provided within the storage bin rack when the contents-aware storage bin is placed within the storage bin rack.

A method for tracking inventory using a contents-aware storage bin includes receiving RFID data from an RFID reader over a wireless network. The RFID reader is associated with a transportable bin unit adapted for placement within a storage bin rack. The received RFID data is stored on a network-connected storage device. Access is provided to the stored RFID data over the network.

A method for producing a contents-aware storage bin includes affixing an RFID reader unit to a transportable bin unit adapted for placement within a storage bin rack. An RFID antenna is placed upon the bin unit. The RFID antenna is connected to the RFID unit. The RFID reader unit comprises a wireless communication device for transmitting RFID data collected by the RFID reader to a wireless base station connected to a computer network.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to the use of contents-aware storage bins and an accompanying rack. Contents-aware storage bins have the ability to know what types of items are stored in each bin and how many items are present. This information may then be communicated to a particular person and/or may be used to generate automated actions such as generating purchase orders and/or updating databases.

The ability to know what items are stored may be used to automatically manage inventory levels and to otherwise track assets. In the home, contents-aware storage bins may be used to notify users when contents stored therein require restocking or when perishable goods have expired. In commerce, contents-aware storage bins may be used to track inventory and collect valuable data such as how often products are removed. Contents-aware storage bins may also be used to notify shopkeepers when products have been placed in the wrong bins. In the corporate environment, contents-aware bins may be used to track the location of assets and ensure that assets removed from bins are properly returned. In the industrial environment, contents-aware storage bins may be used to quickly and accurately assess the need for replacement stock and automatically requisition replacements as needed. Contents-aware bins may also be used during product assembly to reconcile the parts removed from the bins against a bill of materials for that product so that the assembler may easily know when either too many or two few parts have been used.

Because storage bins tend to be highly mobile, contents-aware bins may be easily removed from the storage bin rack and transported to needed location such as work areas or customer sites. Transportation of storage bins may also occur during the performance of tasks, item collection, order fulfillment, work-in-progress, assembly, etc.

Storage bin racks according to exemplary embodiments of the present invention may store any number of contents-aware storage bins. For example, 10s or 100s of bins may be arranged thereon. A single rack may host a wide range of contents-aware bins in various shapes and sizes. According to some exemplary embodiments of the present invention, a conventional storage bin rack may be used. For such embodiments, all of the necessary apparatus for implementing the contents-aware bins may be contained within the storage bins themselves. According to other exemplary embodiments of the present invention, the storage bin rack may incorporate RFD reading functionality, the ability to communicate with a base station, a data input/output console, communication apparatus for communicating with a base station and/or the ability to sense when bins are removed and returned. It is to be understood that many of the features that are described herein as belonging to the bins may be found to the rack and visa versa. Moreover, many of the features that are described herein as belonging to a base station may be found in the rack and visa versa.

Figure 2:
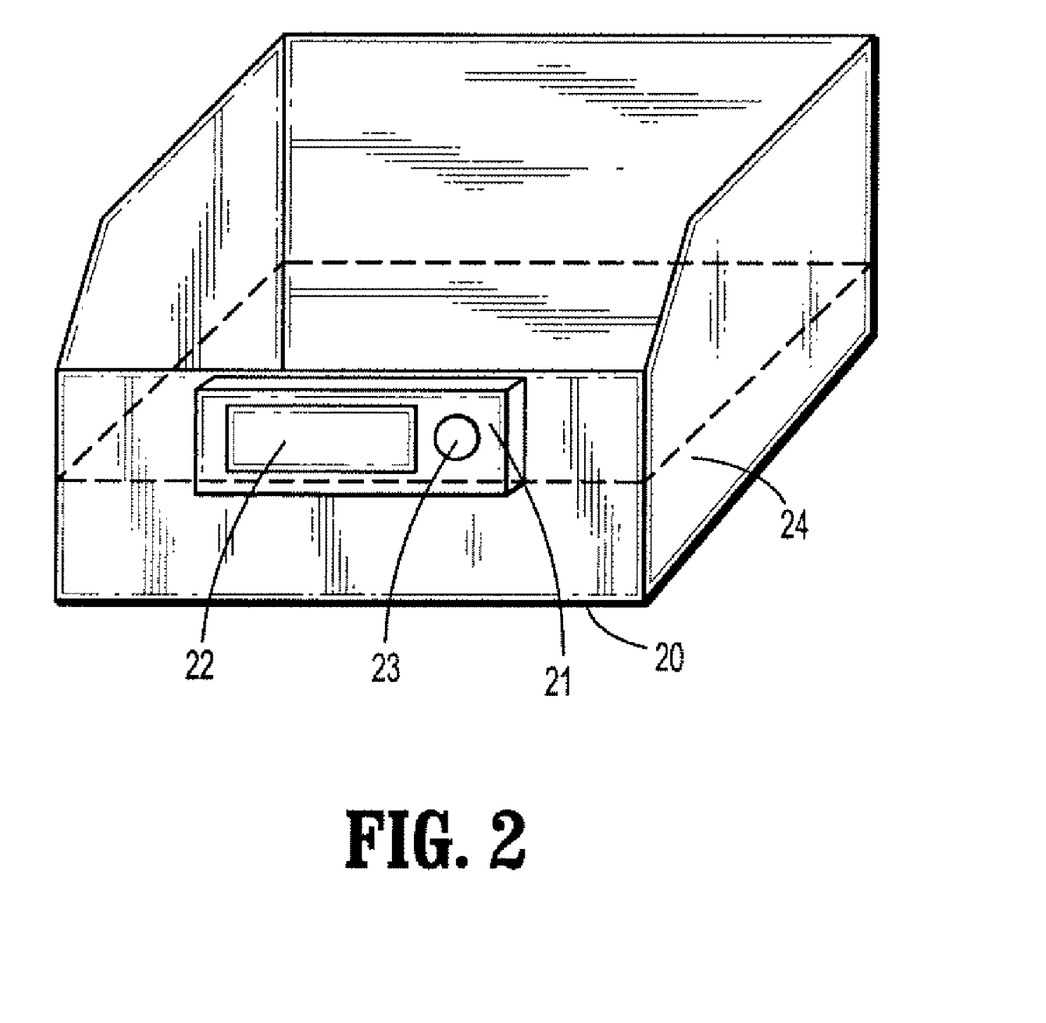
FIG. 2 shows a contents-aware storage bin according to an exemplary embodiment of the present invention.

FIG. 2 illustrates a contents-aware storage bin according to an exemplary embodiment of the present invention. The contents-aware storage bin may include a light-weight and inexpensive bin unit 20. The bin unit 20 may be similar to a conventional storage bin and may use the design of any of the myriad of commercially available storage bins. The bin unit 20 may be specially designed for use as a contents-aware storage bin system or a conventional bin may be retrofitted. The bin unit 20 may have an open top and/or a partially open front and may have one or more walls for defining an area therebetween where items may be stored.

An RFID reader antenna 24 may be provided within or around the bin unit 20. According to one exemplary embodiment of the present invention, the RFID reader antenna 24 may surround the perimeter of the bin unit 20 as shown in FIG. 2. In other exemplary embodiments, the antenna 24 may be placed either on top of or below the bottom surface of the bin unit 24. For example, the antenna 24 may be incorporated into a friction pad such as a rubber-like sheet that may be inserted into the bin unit 24. In this example, the friction pad may serve as both an RFID sensor antenna and a pad to increase friction so that items placed in the bin are more secure. Alternatively, the RFID sensor antenna 24 may be incorporated into the rack, for example, on top of the rack shelving. For such a case, the rack may include electrical contacts that couple with the bin unit 20 when it is seated on the rack.

The bin may also include a user interface module 21 that may be connected to the RFID reader antenna 24. RFID reader circuitry may be embodied within the user interface module 21 or the RFID reader circuitry may be separately embodied and attached to the contents-aware bin. A battery may be used to power the RFID reader. For example, a battery may be included in the interface module 21. The user interface module 21 may also include a display 22, for example, an LCD display. The LCD display may be used to readout the contents of the bin and/or provide the user with other data. The display 22 may be a touch-sensitive display to allow for the user to more easily retrieve desired information. The display 22 may share a power source with the RFID reader circuitry or it may have its own power source. The user interface module 21 may also include or more input devices 23, for example a push-button. Input devices 23 allow for the user to retrieve data and/or turn the display 22 on or off.

Figure 3:
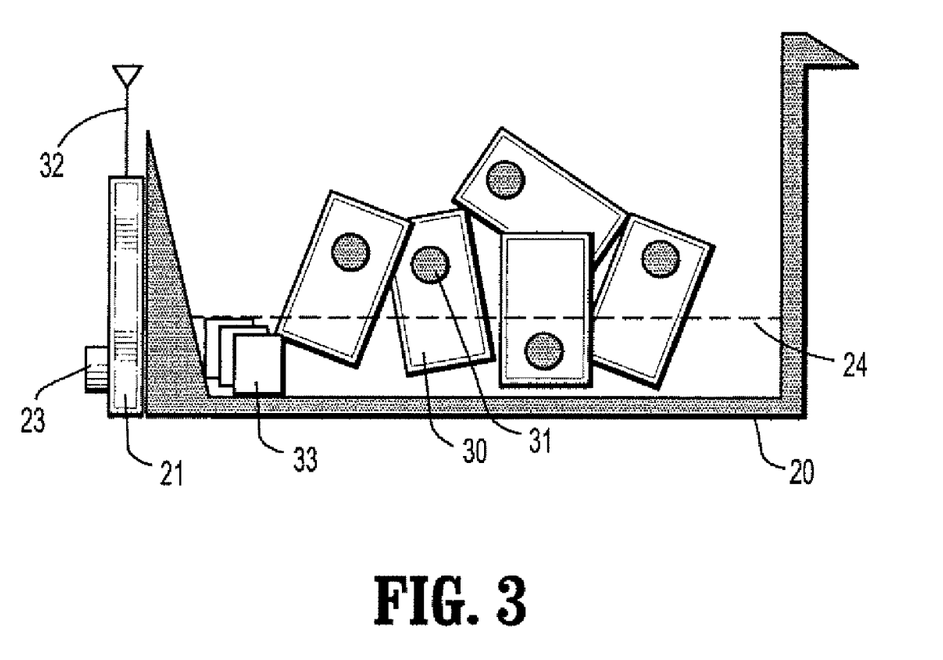
FIG. 3 is a cutaway side view of a contents-aware bin according to an exemplary embodiment of the present invention.

FIG. 3 is a cutaway side view of a contents-aware bin according to an exemplary embodiment of the present invention. The bin unit 20, interface module 21, RFID reader antenna 24 and input device 23 shown in FIG. 1 may also be seen in FIG. 2. The contents-aware storage bin may also include one or more sensors 33 for monitoring the environment of the storage bin. For example, the sensors 33 may monitor acceleration, temperature, humidity and/or ambient light. Sensor information may be collected to ensure proper ambient conditions for sensitive objects such as food and medicines. The sensors 33 may be connected to the interface module 21. The interface module may include a transmitting unit 32 for wirelessly transmitting RFID reader data and/or sensor 33 data to a base station and/or the rack unit. The transmitter may operate as part of a wireless computer network and may be able to relay information to a base station or user console over a local area network (LAN) or over the Internet. Alternatively, the contents-aware storage bin may lack a transmitter 32 and may instead relay information directly to the rack unit over an electrical connection or induction coupled interface when the bin is docked in the rack. For embodiments lacking the transmitter 32, the user interface 21 and/or RFID reader circuitry may be omitted from the bin unit 20. The RFID reader circuitry may then be provided within or upon the rack unit. In one exemplary embodiment, the bin unit 20 may include the RFID reader antenna 24 and all other circuitry may be provided within or upon the rack unit. In another exemplary embodiment, even the antenna 24 may be incorporated into the rack unit.

Accordingly, exemplary embodiments of the present invention may utilize a conventional rack and RFID circuitry may be incorporated into the bin. Alternatively, exemplary embodiments may use a conventional bin and RFID circuitry may be incorporated into the rack. However, in some exemplary embodiments, elements of the RFID circuitry may be provided both in the bin and the rack, for example in one of the ways specifically described herein, or alternatively in another combination.

In use, one or more items 30 may be placed within the bin unit 20. Each item may be provided with an RFID tag 31. The RFID tags 31 may be placed upon the items 30, for example, by the use of an adhesive. Alternatively, the RFID tags 31 may be incorporated into the item 30. According to one exemplary embodiment, the RFID tag 31 is incorporated into an adhesive enclosure for easy application. According to another exemplary embodiment, the RFID tag 31 is manufactured as part of the item 30 by the producer of the item 30.

The RFID tag 31 may either be an active RFID tag or a passive RFID tag. Where the tag is an active RFID tag, a power supply, for example a battery, may be included in the RFID tag. Where the RFID tag is passive, no power supply need be included.

The arrangement of the RFID reader antenna 24 may allow for accurate reading of the RFID tags even when the items 30 are haphazardly arranged.

Figure 4:
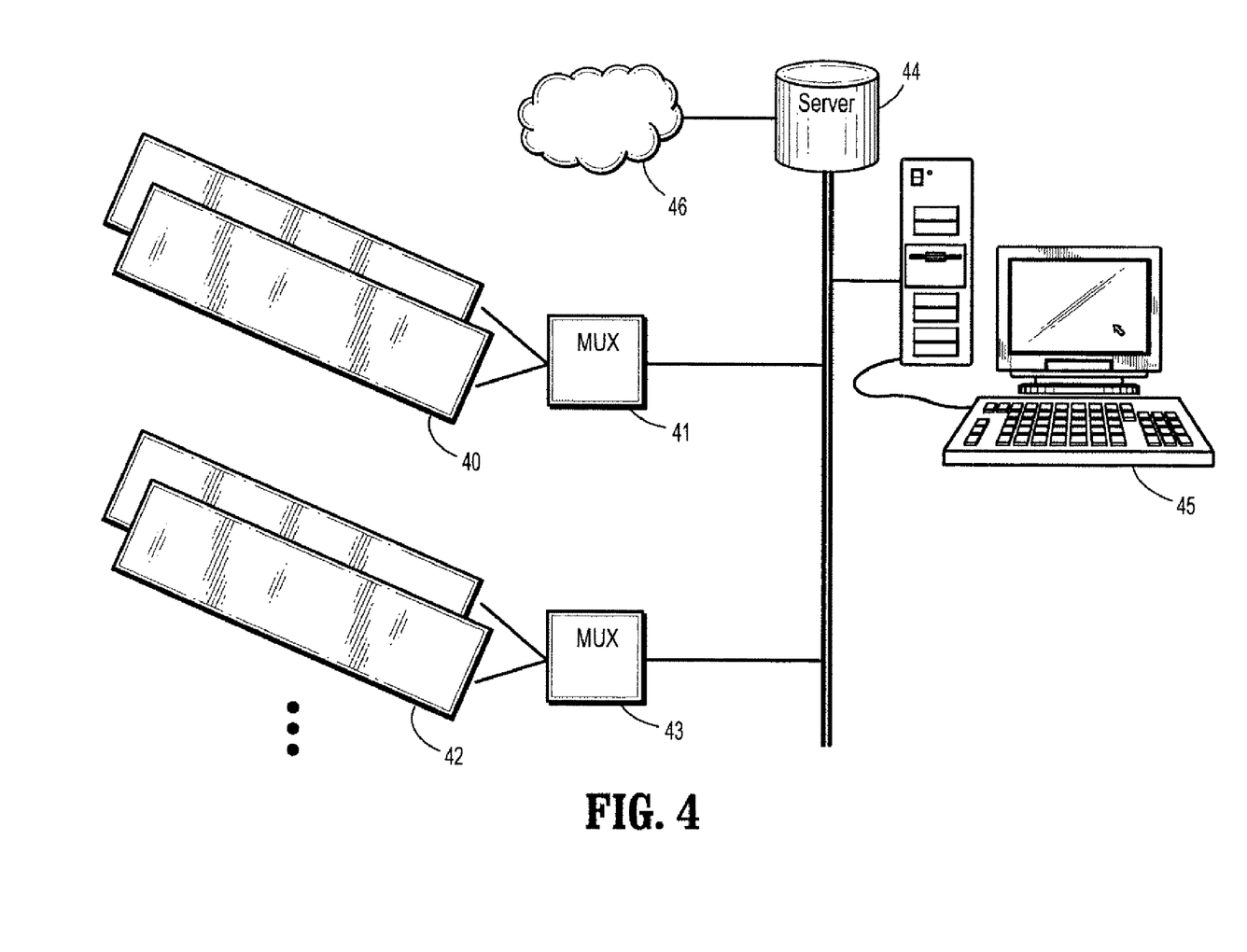
FIG. 4 is a schematic illustrating how an RFID enabled storage bin rack may be arranged according to an exemplary embodiment of the present invention.

As discussed above, according to some exemplary embodiments of the present invention, RFID circuitry may be provided within the rack. FIG. 4 is a schematic illustrating how an RFID enabled storage bin rack may be arranged according to an exemplary embodiment of the present invention. One or more RFID reader antennas 40 may be provided either within a bin unit, as discussed above, or within a rack unit. In either case, there may be one or more RFID reader antenna 40 per bin and/or one or more RFD reader antenna 40 per area of the rack. For example, there may be one RFID reader antenna 40 per bin as discussed above. Additional RFID reader circuitry may be located within the rack unit. In such an arrangement, the RFID reader antenna 40 may make contact with the RFID reader circuitry when the bin unit is seated in the rack unit and contact may be broken when the bin unit is removed from the rack unit.

A multiplexer 41 may allow for multiple antennas 40 to be connected to a communication network at a single point of access. Additional multiplexers 43 may be used and each may be connected to additional RFID reader antennas 42. Alternatively, the use of multiplexers 41 and 43 may be omitted. The communication network may be wireless as described above, or wired as shown in FIG. 4. A server 44 may collect acquired RFID data and the acquired data may be accessed by a terminal 45 connected to the network or over a wide area network (WAN) 46 such as the Internet. The RFID data may be automatically interfaced with automated inventory control systems and/or other automated systems associated with manufacturing supply control, for example, to support just-in-time manufacturing principals.

The server 44 may be a database management system (DBMS) used to manage inventories, track production flow and provide a wide range of data services relating to manufacturing and/or commerce.

Figure 5:
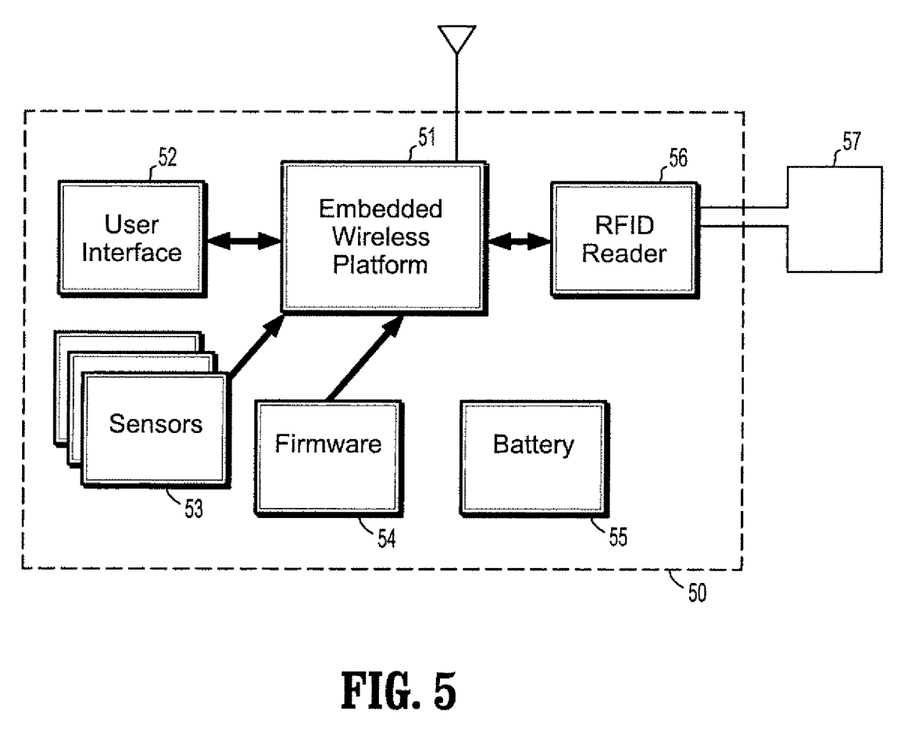
FIG. 5 is a schematic illustrating an RFID reader unit according to an exemplary embodiment of the present invention.

According to an exemplary embodiment of the present invention, the RFD reader circuitry is fully contained within the bin unit, for example, within a RFID reader unit that may be incorporated into the bin unit. FIG. 5 is a schematic illustrating an RFID reader unit 50 according to an exemplary embodiment of the present invention. Here, the RFID reader unit 50 may be contained within a casing for convenient application to a bin unit. One or more RFID reader antenna loops 57 may extend from the RFID reader unit 50 casing, for example, to surround the bin unit, for example, as shown in FIG. 2.

The RFID reader unit 50 may include an RFID reader circuit 56 that connects with the one or more antenna 57 and identifies the quantity and types of RFID tags that are within the bin and thus proximate to the antenna 57 (RFID data). The RFID reader circuit 56 may pass along the RFID data to an embedded wireless platform 51. The embedded wireless platform 51 may be a wireless local area network (LAN) technology such as a technology based on one of the IEEE 802.11 specifications. The reader unit 50 may also include a user interface circuit 52 for interfacing with the user. The user interface circuit 52 may include an LCD, an LCD controller and other input/output devices used to communicate with the user. For example, the user interface circuit 52 may include an LCD that displays the name of the items placed in the bin and/or the number of items placed in the bin. The user interface circuit 52 may also be used to display the number of items removed from the bin for a given project and/or the number of items that must still be removed from the bin in order to complete the project.

One or more sensors 53 may be included within the reader unit 50. The sensors may alternatively be provided outside of the reader unit 50, for example, within the bin. Where the sensors 53 are located outside of the reader unit 50, they may be electrically connected to the reader unit 50.

The reader unit 50 may also include firmware 54 for storing the programming of the reader unit 50. The programming stored in the firmware 54 may control how RFID data is communicated over the wireless platform 51 and/or how the user interface circuit 52 communicates with the user. The firmware 54 may be reprogrammable to allow for updated system software. Although not shown, the reader unit 50 may also include a microprocessor for coordinating the function of the reader unit 50. The reader unit may also include a wired embedded communication platform either instead of or in addition to the wireless platform 51. The wired platform may utilize a connection interface that may allow for the bin to be removed from the rack and brought to a work area where the bin may be plugged in to enable communication. Alternatively, communication to the LAN may be made available when the bin is coupled to the rack and unavailable when the bin is removed from the rack.

The firmware 54 may control the mode of the RFID reader, for example, to place the reader in a multiple tag read mode. The firmware 54 may also allow for asynchronous communication with the RFID reader so that the RFID reader may activate and locate only when a reading is desired rather than have the reader locked in a state of perpetual reading. The firmware 54 may also include instructions for controlling the user interface display, light emitting devices such as LEDs, on-board memory, and responding to button presses.

The reader unit 50 may also include one or more power supplies, for example, a battery 55 for powering the various circuits of the reader unit 50. The battery 55 may be replaceable and/or rechargeable. Where the battery is rechargeable, it may be able to draw power to recharge from the rack unit when coupled.

Figure 6:
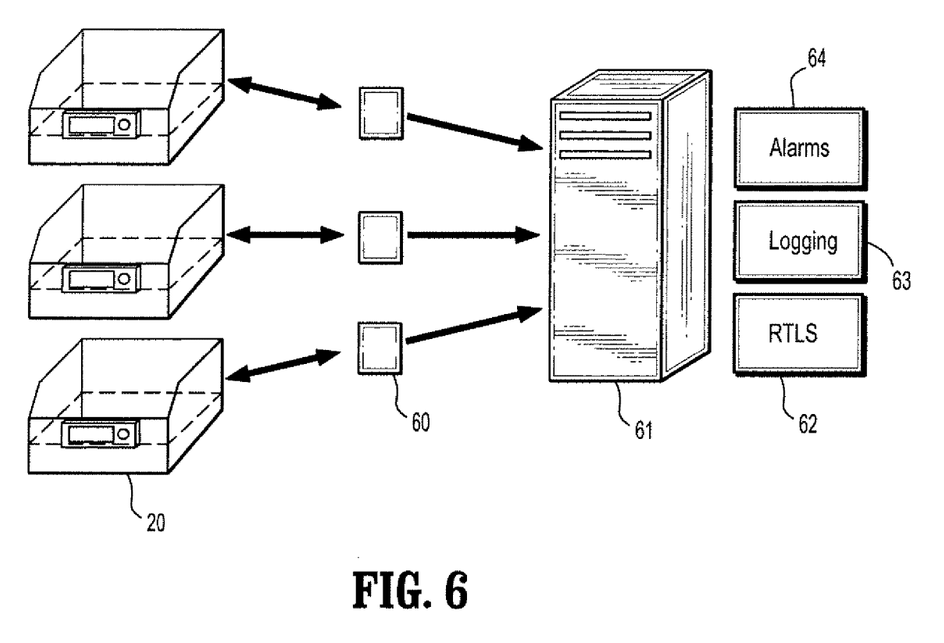
FIG. 6 is a schematic showing a two-tiered system may be used to acquire and utilize RFID data according to an exemplary embodiment of the present invention.

FIG. 6 is a schematic showing a two-tiered system may be used to acquire and utilize RFID data according to an exemplary embodiment of the present invention. At a lower level, contents-aware bins 20 communicate with data collection base stations 60 (e.g. PDAs or PCs equipped with wireless transceivers). At a higher level, the base stations communicate, wirelessly and/or over a wired connection, to a central server 61. The central server 61 may run added value services such as workflow management, alarm triggering and distribution 64, data logging 63, location-based services, for example, resource allocation and real-time location systems (RTLS) 62.

The RFID data and sensor data may be transmitted to the base station along with workflow and other semantic information. For example, transmitted information may include a time stamp, a unique identifier for the particular bin, the role of the bin within a workflow, e.g. static storage, movable storage (such as a unique work in progress or assembly step), location information, e.g. as provided by a real-time location service, data collected from sensors S installed in the bin, such as temperature, weight, acceleration, and the bin's present contents, for example, indexed by a unique RFID (e.g. 8-bit), item name, quantity, etc. Information pertaining to which items have been added and/or removed within a particular time frame may also be collected and transmitted.

The table below illustrates an example information report that may be generated and transmitted by a contents-aware storage bin according to an exemplary embodiment of the present invention:

---

TIME: 14:46:04
BIN ID: 0A3337FD12A36BF9
CONTENTS: WORK IN PROGRESS, FAN ASSEMBLY
STATUS: IN TRANSFER FROM RACK # 326
RTLS: 2ND FLOOR, MAIN CORRIDOR, X=30.3M, Y=19.7M
SENSOR DATA:
    TEMPERATURE: 72F, MIN 71F, MAX 74F
    WEIGHT: 650G
    ACCELERATION: MIN 1G, MAX 2.4G [AT 14:23H]
CONTENTS:
    FAN HEAD, 1, ID: 0A3337FD12A343A1
        PRECISION PLIERS, 1, ID: 0A3337FD12A513A9
        PLASTIC NUTS, 4, ID: 0A3337FD12A523A9,
            0A3337FD12A533A9,
            0A3337FD12A543A9,
            0A3337FD12A5539A
    REMOVED CONTENTS
        GREASE BOTTLE, 1, ID: 0A3337FE12B55301

---

RFID data may also be accessible as a tree diagram where items may be indexed by item names. Item images may also be used along with item names to provide a graphical representation. Items may also be indexed by bin identifiers. When items are indexed by item names, each item may appear as a parent node with a sublist of bins in which that item is found. When items are indexed by bins, each bin may appear as a parent node and sublists of items contained in the bins may be associated therefrom.

Exemplary embodiments of the present invention provide for the retrofitting of standard storage bins and storage bin racks. Retrofit may include the application of a RFID reader unit to the bin, for example, in the front-side panel of the bin. A loop antenna may then be applied to the inside or outside perimeter of the bin and connected to the RFID reader unit. Such a retrofit may be simply and quickly implemented and would not require modification of the associated bin rack. A wireless LAN may then be established in the vicinity of the contents-aware bin. A pre-existing wireless LAN may be used for this purpose. The RFID reader unit may be configured to utilize the wireless LAN, for example, by entering a wireless security password such as a WEP key. Alternatively, the RFID reader unit may be configured to utilize the wireless LAN by updating the firmware, for example, by connecting the RFID reader to a computer system capable of performing a firmware update.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A contents-aware storage bin, comprising: a transportable bin unit adapted for placement within a storage bin rack; an RFID reader unit in contact with the transportable bin unit; an RFID antenna connected to the RFID reader unit and in contact with the transportable bin unit, wherein the transportable bin unit is completely removable from the storage bin rack, wherein the RFID antenna consists of a loop antenna circumscribed about an entire perimeter of the transportable bin unit; wherein the RFID reader unit comprises a wireless communication device for transmitting RFID data collected by the RFID reader unit to a wireless base station connected to a computer network, wherein the wireless communication device is located within the storage bin rack such that the transportable bin unit is capable of transmitting RFID data to the storage bin rack when the transportable bin unit is completely removed therefrom, and wherein the RFID antenna is incorporated into pad removably placed in the transportable bin unit.

2. The contents-aware storage bin of claim 1, additionally comprising one or more sensors connected to the wireless communication device and in contact with the bin unit, wherein the wireless communication device transmits sensor data collected by the one or more sensors to the wireless base station.

3. The contents-aware storage bin of claim 2, wherein the one or more sensors comprise at least one of a temperature sensor, a humidity sensor, a light sensor, a weight sensor, or an acceleration sensor.

4. The contents-aware storage bin of claim 1, wherein the RFID reader unit comprises a user interface unit comprising a display for displaying RFID data collected by the RFID reader.

5. The contents-aware storage bin of claim 1, wherein the RFID antenna is incorporated in to a friction pad that is placed within the bin unit.

6. A contents-aware storage bin, comprising: a transportable bin unit adapted for placement within a storage bin rack; an RFID antenna in contact with the transportable bin unit, wherein the transportable bin unit is completely removable from the storage bin rack and wherein the RFID antenna connects to an RFID reader unit provided within the storage bin rack when the contents-aware storage bin is placed within the storage bin rack, wherein the RFID antenna consists of a loop antenna circumscribed about an entire perimeter of the transportable bin unit, wherein the RFID reader unit comprises a wireless communication device for transmitting RFID data collected by the RFID reader unit to a wireless base station connected to a computer network, wherein the wireless communication device is located within the storage bin rack such that the transportable bin unit is capable of transmitting RFID data to the storage bin rack when the transportable bin unit is completely removed therefrom, and wherein the RFID antenna is incorporated into a pad removably placed in the transportable bin unit.

7. The contents-aware storage bin of claim 6, additionally comprising one or more sensors in contact with the bin unit, wherein the one or more sensors connect to the RFID reader unit provided within the storage bin rack when the contents-aware storage bin is placed within the storage bin rack.

8. The contents-aware storage bin of claim 6, wherein the RFID antenna is incorporated in to a friction pad that is placed within the bin unit.

9. A method for tracking inventory using a contents-aware storage bin, comprising: receiving RFID data from an RFID reader, associated with a transportable bin unit adapted for placement within a storage bin rack, over a wireless network; storing received RFID data on a network-connected storage device; providing access to the stored RFID data over the network, wherein the transportable bin unit is completely removable from the storage bin rack and wherein the RFID reader acquires the RFID data using an RFID antenna that consists of a loop antenna that is circumscribed bout an entire perimeter of the transportable bin unit, wherein the RFID reader unit comprises a wireless communication device for transmitting RFID data collected by the RFID reader unit to the network connected storage device over the wireless network, wherein the wireless communication device is located within the storage bin rack such that the transportable bin unit is capable of transmitting RFID data to the storage bin rack when the transportable bin unit is completely removed therefrom, and wherein the RFID antenna is incorporated into a pad removably placed in the transportable bin unit.

10. The method of claim 9, wherein the RFID data is accessed by a database management system (DBMS).

11. The method of claim 9, further comprising:
receiving sensor data from one or more sensors, associated with the bin unit, over the wireless network;
storing the received sensor data in the storage device; and
providing access to the stored sensor data over the network.

12. The method of claim 11, wherein the one or more sensors comprise at least one of a temperature sensor, a humidity sensor, a light sensor, a weight sensor, or an acceleration sensor.

13. A method for producing a contents-aware storage bin adapted for placement within a storage bin rack, comprising: affixing an RFID reader unit to a transportable bin unit adapted for placement within and complete removal from a storage bin rack; placing an RFID antenna upon the transportable bin unit by affixing a RFID antenna to the transportable bin unit such that the RFID antenna is circumscribed about an entire perimeter of the transportable bin unit, wherein the RFID antenna comprises a loop antenna; connecting the RFID antenna to the RFID reader unit, wherein the RFID reader unit comprises a wireless communication device for transmitting RFID data collected by the RFID reader unit to a wireless base station connected to a computer network, locating the wireless communication device within the storage bin rack such that the transportable bin unit is capable of transmitting RFID data to the storage bin rack when the transportable bin unit is completely removed therefrom, and incorporating the RFID antenna into a pad removably placed in the transportable bin unit.

14. The method of claim 13, additionally comprising placing one or more sensors upon the bin unit, the one or more sensors being connected to the wireless communication device for transmitting sensor data collected by the one or more sensors to the wireless base station.

15. The method of claim 13, wherein the step of placing an RFID antenna upon the bin unit comprises placing a friction pad comprising the RFID antenna into the bin unit.

16. The method of claim 13, additionally comprising configuring the wireless communication device to communicate with the wireless base station.

* * * * *